United States Patent
Chinthalapati et al.

(10) Patent No.: US 10,439,932 B2
(45) Date of Patent: Oct. 8, 2019

(54) SYSTEM AND METHOD FOR FLOW RULE MANAGEMENT IN SOFTWARE-DEFINED NETWORKS

(71) Applicant: AVAGO TECHNOLOGIES INTERNATIONAL SALES PTE. LIMITED, Singapore (SG)

(72) Inventors: Eswara S. P. Chinthalapati, San Jose, CA (US); Ramakant Jangid, Bangalore (IN); Sherin Selvaraj, Tamilnadu (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 90 days.

(21) Appl. No.: 15/719,263

(22) Filed: Sep. 28, 2017

(65) Prior Publication Data
US 2018/0097723 A1   Apr. 5, 2018

Related U.S. Application Data

(60) Provisional application No. 62/404,682, filed on Oct. 5, 2016.

(51) Int. Cl.
| | |
|---|---|
| *H04L 12/721* | (2013.01) |
| *H04L 12/851* | (2013.01) |
| *H04L 12/743* | (2013.01) |
| *H04L 12/935* | (2013.01) |
| *H04L 12/715* | (2013.01) |

(52) U.S. Cl.
CPC .............. *H04L 45/38* (2013.01); *H04L 47/24* (2013.01); *H04L 45/64* (2013.01); *H04L 45/7457* (2013.01); *H04L 49/30* (2013.01)

(58) Field of Classification Search
CPC . H04L 45/7457; H04L 49/3009; H04L 45/74; H04L 47/24; H04L 41/0806; H04L 45/745; H04L 47/20; H04L 45/38; H04L 45/64; H04L 45/54; H04L 43/0811; H04L 41/0816
See application file for complete search history.

(56) References Cited

U.S. PATENT DOCUMENTS

| | | | |
|---|---|---|---|
| 8,762,501 B2* | 6/2014 | Kempf | H04L 12/4633 709/220 |
| 2013/0010600 A1* | 1/2013 | Jocha | H04L 43/026 370/236.2 |
| 2013/0010605 A1* | 1/2013 | Jocha | H04L 43/026 370/241.1 |

(Continued)

*Primary Examiner* — Jung Liu
(74) *Attorney, Agent, or Firm* — Xsensus LLP

(57) ABSTRACT

Embodiments described herein provide a switch. The switch can include one or more ports, a communication module, and a flow rule management module. During operation, the communication module obtains a flow rule from a notification message from a controller of a software-defined network. The flow rule management module then determines whether a priority value of the flow rule is in a local flow table. The flow table can store flow rules received from the controller. If the priority value of the flow rule is not in the local flow table, the flow rule management module stores the flow rule in a location of the flow table allocated for the priority value.

20 Claims, 13 Drawing Sheets

(56) References Cited

U.S. PATENT DOCUMENTS

| | | | | |
|---|---|---|---|---|
| 2013/0046882 A1* | 2/2013 | Takashima | ............... | H04L 45/38 |
| | | | | 709/224 |
| 2013/0058225 A1* | 3/2013 | Casado | ............... | H04L 12/4633 |
| | | | | 370/250 |
| 2013/0058350 A1* | 3/2013 | Fulton | ................ | H04L 41/0896 |
| | | | | 370/400 |
| 2013/0077481 A1* | 3/2013 | Philavong | ............... | H04L 45/38 |
| | | | | 370/228 |
| 2013/0170495 A1* | 7/2013 | Suzuki | ............... | H04L 49/3009 |
| | | | | 370/392 |
| 2013/0266017 A1* | 10/2013 | Akiyoshi | ................ | H04L 47/18 |
| | | | | 370/392 |
| 2013/0272135 A1* | 10/2013 | Leong | ................ | H04L 41/0823 |
| | | | | 370/241 |
| 2013/0322440 A1* | 12/2013 | Chiba | ................ | H04L 49/3009 |
| | | | | 370/389 |
| 2015/0009828 A1* | 1/2015 | Murakami | .......... | H04L 47/2441 |
| | | | | 370/235 |
| 2015/0249572 A1* | 9/2015 | Mack-Crane | ........... | H04L 45/38 |
| | | | | 709/222 |
| 2015/0334001 A1* | 11/2015 | Sato | .................... | H04L 12/6418 |
| | | | | 370/392 |
| 2015/0372911 A1* | 12/2015 | Yabusaki | ................ | H04L 67/34 |
| | | | | 709/226 |

* cited by examiner

SYSTEM AND METHOD FOR FLOW RULE MANAGEMENT IN SOFTWARE-DEFINED NETWORKS

RELATED APPLICATIONS

This application claims the benefit of U.S. Provisional Application No. 62/404,682, titled "System and Method for Flow Rule Management in Software-Defined Networks," by inventors Eswara S. P. Chinthalapati, Ramakant Jangid, and Sherin Selvaraj, filed 5 Oct. 2016, the disclosure of which is incorporated by reference herein.

BACKGROUND

Field

The present disclosure relates to network management. More specifically, the present disclosure relates to a method and system for efficient management of flow definitions in a software-defined network.

Related Art

The exponential growth of the Internet has made it a popular delivery medium for heterogeneous data flows. Such heterogeneity has caused an increasing demand for bandwidth. As a result, equipment vendors race to build larger and faster switches with versatile capabilities, such as defining data flows using software, to move more traffic efficiently. However, the complexity of a switch cannot grow infinitely. It is limited by physical space, power consumption, and design complexity, to name a few factors. Furthermore, switches with higher and more versatile capability are usually more complex and expensive.

Software-defined flow is a new paradigm in data communication networks. Any network supporting software-defined flows can be referred to as a software-defined network. An example of a software-defined network can be an OpenFlow network, wherein a network administrator can configure how a switch behaves based on data flows that can be defined across different layers of network protocols. A software-defined network separates the intelligence needed for controlling individual network devices (e.g., routers and switches) and offloads the control mechanism to a remote controller device (often a standalone server or end device). Therefore, a software-defined network provides complete control and flexibility in managing data flow in the network.

While support for software-defined flows brings many desirable features to networks, some issues remain unsolved in management of rules in a software-defined network. For example, because the priority of a flow rule is enforced in forwarding hardware of a switch based on the order of the flow rule, managing and updating flow rules in the forwarding hardware can be challenging.

SUMMARY

Embodiments described herein provide a switch. The switch can include one or more ports, a communication module, and a flow rule management module. During operation, the communication module obtains a flow rule from a notification message from a controller of a software-defined network. The flow rule management module then determines whether a priority value of the flow rule is in a local flow table. The flow table can store flow rules received from the controller. If the priority value of the flow rule is not in the local flow table, the flow rule management module stores the flow rule in a location of the flow table allocated for the priority value.

In a variation on this embodiment, if the priority value of the flow rule is in the local flow table, the flow rule management module discards the flow rule obtained from the notification message and generates a second notification message for the controller indicating that the priority value of the flow rule is already in the flow table.

In a variation on this embodiment, if the priority value of the flow rule is in the local flow table, the flow rule management module identifies an overriding instruction for the priority value, frees the location of the flow table allocated for the priority value, and stores the flow rule in the location. Freeing the location can include bubbling up a second flow rule stored in the location.

In a variation on this embodiment, the flow table is stored in a content-addressable memory (CAM).

In a variation on this embodiment, the switch also includes a storage management module, which determines a size of a first memory chunk for port-specific flow rules based on a minimum priority value and a maximum number of port-specific flow rules expected at the switch. The storage management module then allocates the first memory chunk of the determined size for the flow table.

In a variation on this embodiment, the switch also includes a flow rule processing module, which converts a generic flow rule to a set of port-specific flow rules. A respective converted port-specific flow rule is specific to a software-definable port in the one or more ports.

In a further variation, the switch also includes a storage management module, which determines a size of a second memory chunk for converted port-specific flow rules based on a maximum number of generic flow rules expected at the switch and a number of software-definable ports of the switch. The storage management module allocates the second memory chunk of the determined size for the flow table, thereby allowing a respective converted flow-specific flow rule to be stored in the flow table In a further variation, the flow rule processing module also determines a set of continuous priority values for the set of port-specific flow rules based on one or more of: (i) a base priority value for the generic flow rule, and (ii) a set of next available continuous priority values.

In a further variation, the flow rule management module also stores the set of port-specific flow rules in a memory block in the second memory chunk. The memory block corresponds to the set of continuous priority values.

In a variation on this embodiment, the switch is an OpenFlow-capable switch.

BRIEF DESCRIPTION OF THE FIGURES

In the figures, like reference numerals refer to the same figure elements.

DETAILED DESCRIPTION

Figure 1A:
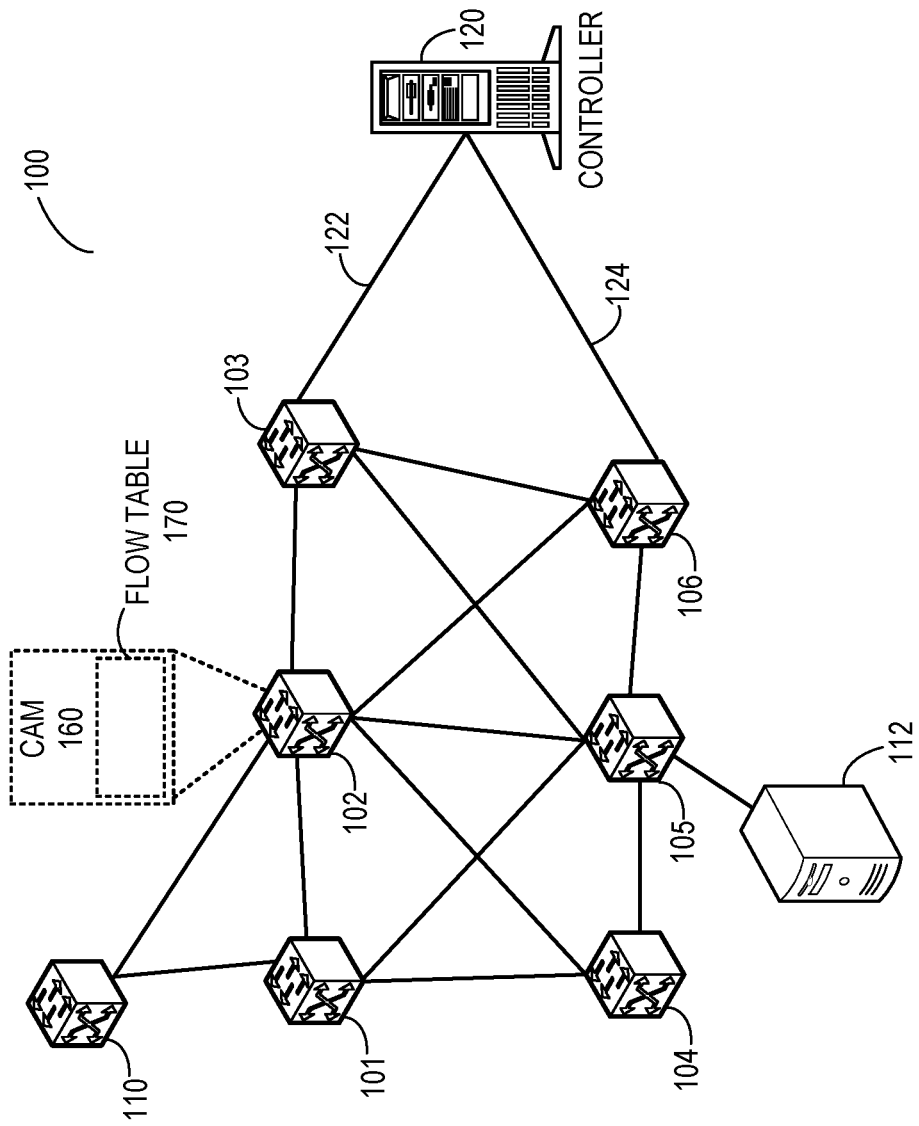
FIG. 1A illustrates an exemplary software-defined network supporting priority-specific flow rules, in accordance with an embodiment of the present application.

The following description is presented to enable any person skilled in the art to make and use the embodiments described herein, and is provided in the context of a particular application and its requirements. Various modifications to the disclosed embodiments will be readily apparent to those skilled in the art, and the general principles defined herein may be applied to other embodiments and applications without departing from the spirit and scope of the embodiments described herein. Thus, the present invention is not limited to the embodiments shown, but is to be accorded the widest scope consistent with the claims.

Overview

The embodiments described herein solve the problem of efficiently storing flow rules in a flow table of a switch by: (1) maintaining strict priorities for the flow rules; and (2) storing the flow rules in a pre-allocated slot for that priority, thereby allowing addition, deletion, and updating of flow rules without changing the existing flow rules. Typically, a switch in a software-defined network (SDN) processes a packet based on the order of the flow rule in the flow table. Therefore, the order of the flow rules in the flow table enforces the respective priorities of the flow rules.

With existing technologies, if a switch receives a new (or updated) flow rule from a controller of the software-defined network, the switch updates the flow table. The switch can maintain the forwarding table in the forwarding hardware (e.g., a content-addressable memory (CAM)). However, to ensure the flow rules are stored in the order of the priorities in the flow table (i.e., a higher priority flow rule appears before a lower priority flow rule), the switch rearranges the flow rules in the flow table to accommodate the new flow rule in the order of the priority. If the flow table is updated each time the switch receives a flow rule, the switch needs to rearrange the flow rules frequently. Even when the switch collects the flow rules and updates the flow rules periodically, the switch may incorrectly forward a packet based on an incorrect flow rule, thereby causing packet leaks and drops.

To solve the problem, the switch allocates a portion of the CAM for flow rules based on the range of priorities and enforcing strict priorities in the flow table. These flow rules can be specific to an input port and can be referred to as port-specific flow rules. During operation, the switch allows a user (e.g., an administrator) to turn on strict priority for the switch. The switch also obtains a minimum priority value and a maximum number of port-specific flow rules for the switch. The switch then determines a priority range indicating the lower and upper limits of the priority values, and determines the memory chunk required to store a flow rule with a respective priority in the range.

In some embodiments, the controller can issue generic flow definitions. A generic flow definition can specify a flow rule that is not specific to any input port of a switch. If the switch supports automatic conversion, the switch converts a generic flow definition to port-specific flow rules, each corresponding to a software-definable port. A port-specific flow rule is specific to an input port of the switch. The switch obtains a maximum number of generic flow rules for the switch and determines the memory chunk required to store converted port-specific flow rules for a respective generic flow definition within the maximum number of generic flow rules.

The switch then allocates the determined memory chunks in the CAM for the flow table. The switch only allows one flow rule per priority. Upon receiving a flow rule from the controller of the software-defined network, the switch stores the flow rule in the location associated with the priority of the flow rule in the flow table. As a result, the switch does not need to change the location of the existing flow rules. In addition, when the switch receives a generic definition, the switch converts the corresponding generic flow rule to a set of port-specific flow rules, one for each port capable of processing packets based on flow rules (can be referred to as "software-definable ports"). The switch allocates priorities to these port-specific flow rules based on the number of ports. For example, if there are five software-definable ports in the switch, a generic flow rule with a priority value of 220 is converted to 5 port-specific flow rules with priorities 220, 221, 222, 223, and 224, respectively.

In this disclosure, the term "software-defined network" refers to a network that facilitates control over a respective data flow by specifying the action associated with the flow in a flow definition. A controller, which can be a server, coupled to the software-defined network provides a respective switch in the software-defined network with the flow definitions. A flow definition can include a priority value, a rule that specifies a flow, and an action (e.g., a forwarding port or "drop") for the flow. The rule of a flow definition can specify, for example, any value combination in the ten-tuple of {in-port, VLAN ID, MAC SA, MAC DA, Ethertype, IP SA, IP DA, IP Protocol, TCP source port, TCP destination port}. Other packet header fields can also be included in the flow rule. Depending on its specificity, a flow rule can correspond to one or more flows in the network. Upon matching a respective packet to a rule, the switch in the software-defined network takes the action included in the corresponding flow definition. An example of a software-defined network includes, but is not limited to, OpenFlow, as described in Open Networking Foundation (ONF) specification "OpenFlow Switch Specification," available at http://www.openflow.org/documents/openflow-spec-v1.1.0.pdf, which is incorporated by reference herein.

In this disclosure, a switch in a software-defined network capable of processing software-defined flows is referred to as a "software-definable" switch. Such a software-definable switch can include both ports that process software-defined flows and ports reserved for conventional packet forwarding (e.g., layer-2/Ethernet switching, or IP routing), which are referred to as "regular ports" in this disclosure. A flow definition typically includes one or more software-definable in-ports to which the definition is applicable. Any flow arriving via any port can potentially be a match for the generic flow definition.

In some embodiments, the software-defined network is a fabric switch and a respective switch in the software-defined network is a member switch of the fabric switch. The fabric switch can be an Ethernet fabric switch. In an Ethernet fabric switch, any number of switches coupled in an arbitrary topology may logically operate as a single switch. Any new switch may join or leave the fabric switch in "plug-and-play" mode without any manual configuration. A fabric switch can appear as a single logical switch to the end device.

Although the present disclosure is presented using examples based on OpenFlow, embodiments described herein are not limited to networks defined by OpenFlow or a particular Open System Interconnection Reference Model (OSI reference model) layer. In this disclosure, the term "software-defined network" is used in a generic sense, and can refer to any network which facilitates switching of data flows based on software-defined rules. The term "flow definition" is also used in a generic sense, and can refer to any rule which identifies a frame belonging to a specific flow and/or dictates how a switch should process the frame.

The term "end device" can refer to a host, a conventional layer-2 switch, or any other type of network device. Additionally, an end device can be coupled to other switches or hosts further away from a network. An end device can also be an aggregation point for a number of network devices to enter the network.

The term "packet" refers to a group of bits that can be transported together across a network. "Packet" should not be interpreted as limiting embodiments described herein to any networking layer. "Packet" can be replaced by other terminologies referring to a group of bits, such as "message," "frame," "cell," or "datagram."

The term "switch" is used in a generic sense, and it can refer to any standalone or fabric switch operating in any network layer. "Switch" should not be interpreted as limiting embodiments described herein to layer-2 networks. Any device that can forward traffic to an end device can be referred to as a "switch." Examples of a "switch" include, but are not limited to, a layer-2 switch, a layer-3 router, a TRILL RBridge, an FC router, or an FC switch.

The term "fabric switch" refers to a number of interconnected physical switches that form a single, scalable logical switch. In a fabric switch, any number of switches can be connected in an arbitrary topology, and the entire group of switches functions together as one single switch. This feature makes it possible to use many smaller, inexpensive switches to construct a large fabric switch, which can be viewed externally as a single switch. In some embodiments, a respective switch in the fabric switch is an Internet Protocol (IP) routing-capable switch (e.g., an IP router). In some further embodiments, a respective switch in the fabric switch is a Transparent Interconnection of Lots of Links (TRILL) routing bridge (RBridge).

It should be noted that a fabric switch is not the same as conventional switch stacking. In switch stacking, multiple switches are interconnected at a common location (often within the same rack), based on a particular topology, and manually configured in a particular way. These stacked switches typically share a common address, such as an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary physical topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a cluster identifier), which is assigned to the fabric switch. Since a fabric switch can be represented as a logical chassis, the fabric identifier can also be referred to as a logical chassis identifier. A respective member switch of the fabric switch is associated with the fabric identifier. In some embodiments, a fabric switch identifier is pre-assigned to a member switch. As a result, when the switch joins a fabric switch, other member switches identify the switch as a member switch of the fabric switch.

Network and Switch Architecture

FIG. 1A illustrates an exemplary software-defined network supporting priority-specific flow rules, in accordance with an embodiment of the present application. A software-defined network 100 includes switches 101, 102, 103, 104, 105, and 106, which are capable of processing software-defined flows and can be referred to as software-definable switches. Controller 120 is logically coupled to a respective software-definable switch in network 100. Note that controller 120 can be physically coupled to only a subset of the switches. In this example, controller 120 is coupled to switches 103 and 106 via physical links 122 and 124, respectively. End device 112 is coupled to network 100 via switch 105.

Controller 120 can provide one or more flow definitions to each switch in network 100. The flow definition can include a flow rule, which indicates how a software-defined data flow is processed in network 100. If switch 102 receives a new (or updated) flow definition from controller 120, switch 102 stores the flow definition in flow table 170. In some embodiments, switch 102 stores flow table 170 in its CAM 160. The flow definition can include one or more of: an input port, a flow rule that specifies how a packet received from that input port should be processed, and a priority value. For example, the flow rule can specify which port the packet should be forwarded to or whether the packet should be dropped.

Switch 102 includes one or more software-definable ports. Switch 102 uses its software-definable ports to couple other software-definable switches 101, 103, 104, 105, and 106. Similarly, other software-definable switches also use their respective software-definable ports to couple other software-definable switches. In some embodiments, switch 102 can also include regular ports coupled to regular switches, such as switch 110. During operation, controller 120 sends flow rules to switches 101-106. Switch 102 receives a flow rule and stores the flow rule in a local flow table 170 (e.g., in CAM 160 of switch 102).

With existing technologies, if switch 102 receives a new (or updated) flow definition from controller 120, switch 102 updates its flow table 170 to store the corresponding flow rule. To ensure the flow rules are stored in the order of the priorities in flow table 170, switch 102 stores a higher priority flow rule before a lower priority flow rule in flow table 170. To store the received flow rule, switch 102 rearranges the flow rules in flow table 170 to accommodate the new flow rule in the order of priority.

For example, if two existing flow rules have a lower priority than the new flow rule, switch 102 moves those two flow rules to a lower location in flow table 170 and inserts the new flow rule above the two flow rules. However, if switch 102 updates flow table 170 each time switch 102 receives a flow rule from controller 120, switch 102 needs to rearrange the flow rules in flow table 170 frequently. On the other hand, if switch 102 collects the flow rules and updates the flow rules in flow table 170 periodically, switch 102 can use an incorrect flow rule with an incorrect priority during that period, which leads to packet leaks and drops.

To solve the problem, switch 102 allocates a portion of CAM 160 to store a flow table 170 that enforces strict priorities. During operation, switch 102 allows a user (e.g., an administrator) to turn on strict priority for switch 102. Turning on the strict priority can include configuring a flag in the configuration of switch 102, which enables switch 102 to determine whether switch 102 should enforce strict priority in flow table 170. If switch 102 determines that the user has enabled the strict priority for switch 102, switch 102 can obtain information that allows switch 102 to enforce the strict priority. Otherwise, switch 102 may operate based on existing technologies, as described above.

To enforce the strict priority, switch 102 obtains a minimum priority value and a maximum number of port-specific flow rules for switch 102. Switch 102 then determines a priority value range indicating the lower and upper limits of the priority values of the port-specific flow rules. Switch 102 then determines the memory chunk required to store a flow rule with a respective priority in the range. Switch 102 allocates the determined memory chunk in CAM 160 for flow table 170. For example, if the minimum priority value is 100 and the maximum number of flow rules for switch 102 is 200, the lower and upper limits of the priority values can be 100 and 299, respectively. Switch 102 then determines the memory chunk required to store these 200 flow rules and allocates the determined memory chunk in CAM 160 for flow table 170.

Switch 102 can allow one flow rule for a specific priority value. Upon receiving a flow rule, switch 102 stores that flow rule at a location or slot of flow table 170 allocated for the priority value. If switch 102 receives a flow rule with an already existing priority, switch 102 can discard the flow rule and notify controller 120. In some embodiments, a user can override an existing priority value. Upon receiving an overriding instruction, switch 102 frees the location corresponding to the existing priority value in flow table 170.

To free the location, switch 102 can increment the priority value of the existing flow rule and push the flow rule one slot up (i.e., "bubbles up" the flow rule) in flow table 170. To do so, switch 102 may bubble up a respective flow rule with a higher priority value than the existing priority value until an available location is found in flow table 170. Switch 102 then stores the new flow rule in the freed-up location corresponding to the previously existing priority value.

In some embodiments, switch 102 supports automatic conversion of a generic flow definition to port-specific flow rules. The generic flow definition can include a generic flow rule that does not specify an input port for which the flow rule is applicable. Switch 102 converts that generic flow rule to a port-specific flow rule, which specifies an input port for which the rule is applicable, for a respective software-definable port of switch 102. Switch 102 can also obtain a maximum number of generic flow definitions from the user and determine the memory chunk required to store converted port-specific flow rules for a respective generic flow rule within the maximum number of generic flow rules. Switch 102 then allocates the memory chunk in CAM 160 for flow table 170.

Upon receiving a generic flow rule, switch 102 converts the generic flow rule to port-specific flow rules and stores the port-specific flow rules in flow table 170. Switch 102 allocates priorities to these port-specific flow rules based on the number of ports. For example, if there are five software-definable ports in switch 102, a generic flow rule with a priority value of 220 is converted to 5 port-specific flow rules with priority values 220, 221, 222, 223, and 224, respectively. Switch 102 then stores these flow rules in the location allocated and dedicated for these priority values. It should be noted that switch 102 may enforce a separation of priority value range for generic flows. In this way, switch 102 ensures that the priority values associated with converted port-specific flow rules do not overlap with the priority value range for the port-specific flow rules of switch 102.

Figure 1B:
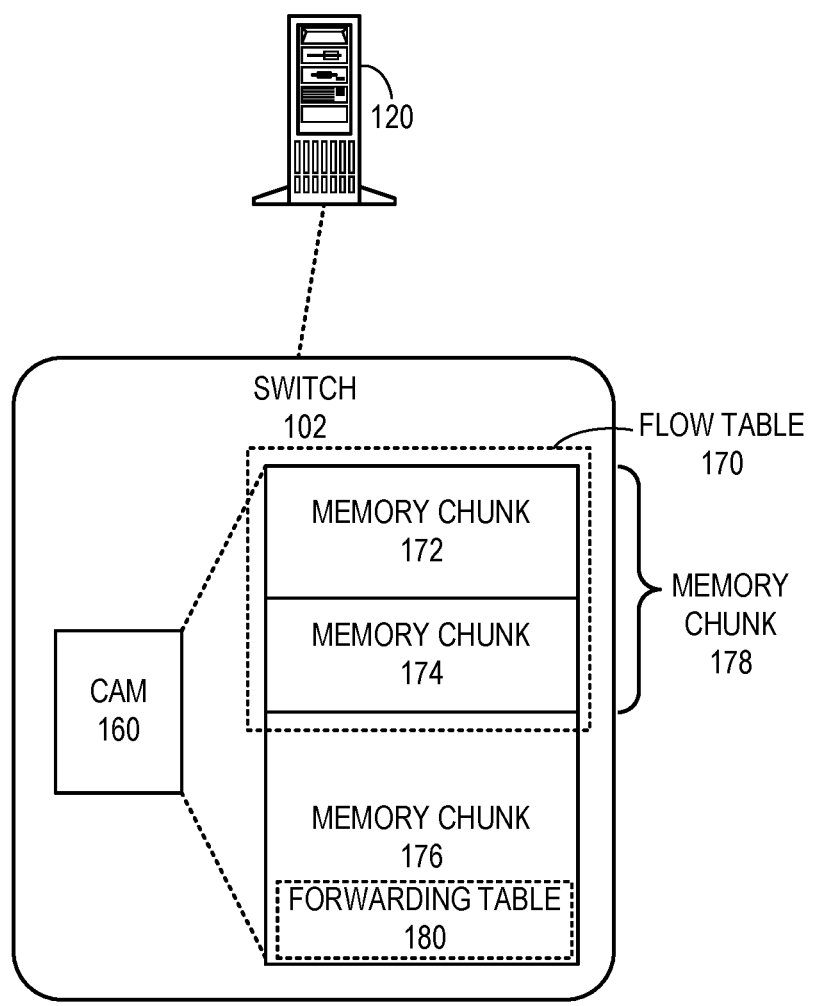
FIG. 1B illustrates an exemplary switch supporting priority-specific flow rules in a software-defined network, in accordance with an embodiment of the present application.

FIG. 1B illustrates an exemplary switch supporting priority-specific flow rules in a software-defined network, in accordance with an embodiment of the present application. In this example, switch 102 allocates memory chunk 178 in CAM 160 for flow table 170. The rest of CAM 160, which includes memory chunk 176 can be used to store forwarding information for regular flows (i.e., non-software-definable flows). To determine the size of memory chunk 178, switch 102 determines the size of a memory chunk for port-specific flow rules and the size of a memory chunk for converted port-specific flow rules. Switch 102 allocates memory chunk 172 for port-specific flow rules and memory chunk 174 for converted port-specific flow rules in memory chunk 178.

Flow table 170 can include a plurality of entries corresponding to a plurality of flow rules; each entry is maintained in a memory location dedicated for that flow rule. An entry includes one or more of: an input port, the flow rule, and a priority value for that rule. The location dedicated for the rule corresponds to the priority value. Furthermore, switch 102 ensures that a respective priority value in flow table 170 is unique. In this way, switch 102 can use the priority value as an index in flow table 170. This index can indicate a unique location in flow table 170 where the corresponding flow role is stored.

If a user reprograms the maximum number of port-specific flow rules for switch 102, switch 102 can resize memory chunk 172 accordingly. Similarly, if the user reprograms the maximum number of generic flow rules for switch 102, switch 102 can resize memory chunk 174 accordingly. To resize a memory chunk, switch 102 can allocate the resized memory chunk in a different location of CAM 160 and copy the existing flow rules to the corresponding resized memory chunk. Switch 102 then can free the old memory chunk.

Storage Management

Figure 2:
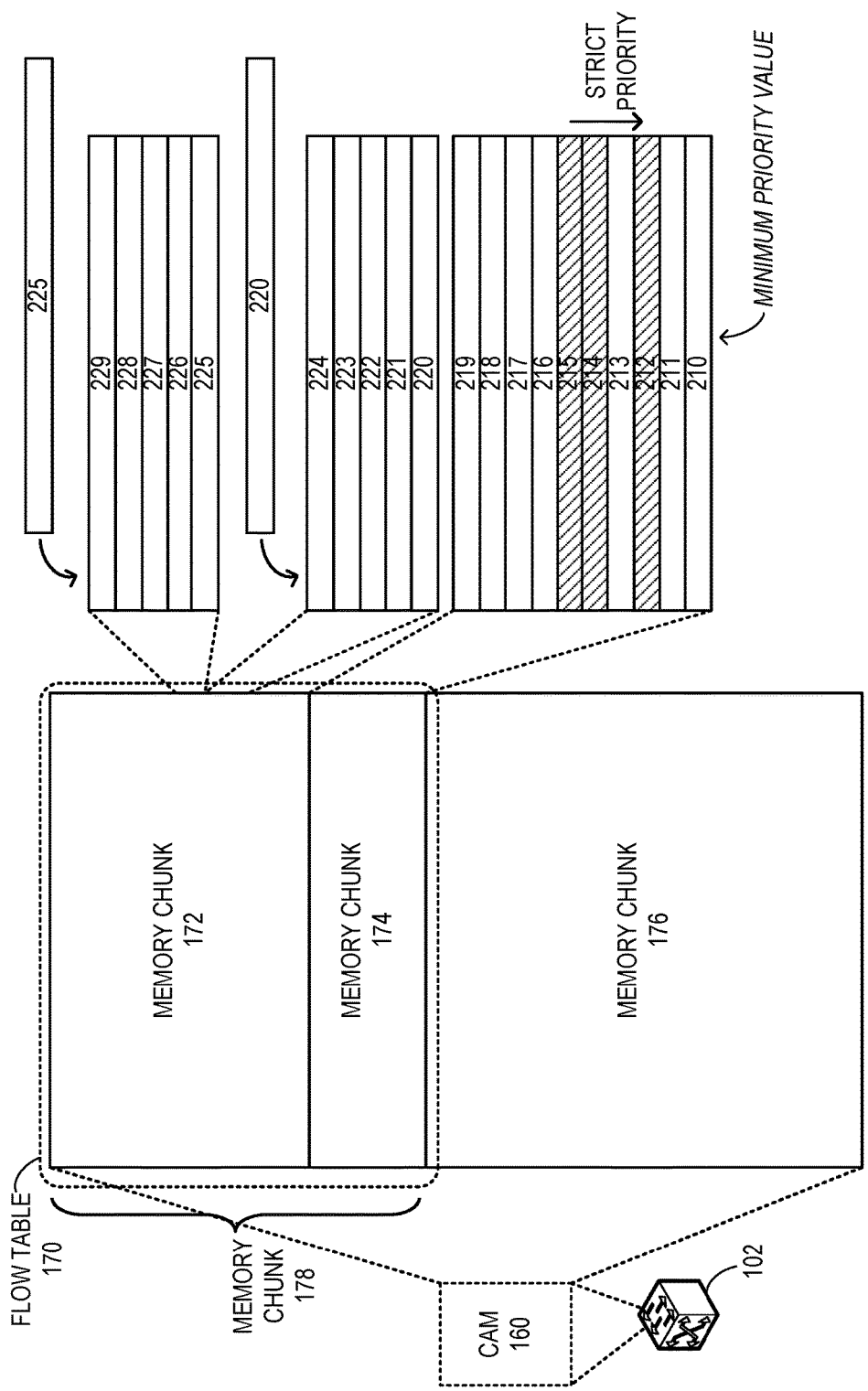
FIG. 2 illustrates an exemplary flow table supporting priority-specific flow rules in a software-defined network, in accordance with an embodiment of the present application.

FIG. 2 illustrates an exemplary flow table supporting priority-specific flow rules in a software-defined network, in accordance with an embodiment of the present application. Since switch 102 only allows one flow rule per priority in flow table 170, switch 102 can determine and allocate the corresponding amount of storage memory to store the flow rules. During operation, if strict priority is enforced for switch 102, switch 102 obtains a minimum priority value 210 for switch 102. Switch 102 can also obtain a maximum number of flow rules. In the example in FIG. 2, this number is 10 for switch 102.

Switch 102 then can determine a priority range, which indicates priority values 210 and 219 to be the lower and upper limits of the priority values, respectively. Here, the range indicates 10 priority values, each corresponding to a flow rule. Switch 102 then determines the size of memory chunk 174 required to store the flow rules in the range. For example, if X kilobytes (X KB) of storage memory is needed to store one flow rule, the size of memory chunk 174 can be 10X KB. Chunk 174 includes memory locations for 10 flow rules with priority values 210-219.

Furthermore, if switch 102 supports automatic conversion of a generic flow definition to port-specific flow rules, switch 102 also obtains a maximum number of generic flow definitions for switch 102 and determines the memory chunk required to store the converted port-specific flow rules for a respective generic flow rule. For example, since switch 102 has 5 software-definable ports, switch 102 may need a 5X KB of memory block to store the 5 port-specific flow rules for a respective generic flow definition. Here, memory chunk 172 can include a plurality of memory blocks. Hence, if the maximum number of generic flow definitions for switch 102 is 10, switch 102 determines the size of memory chunk 172 to be 50X KB. Switch 102 then allocates the memory chunks 172 and 174 (e.g., 60X KB) in CAM 160 for flow table 170.

During operation, switch 102 receives flow rules with priority values 212, 214, and 215. Switch 102 stores these flow rules in the locations associated with priority values 212, 214, and 215, respectively, in memory chunk 174 of flow table 170 (denoted with shaded fill). Since switch 102 enforces strict priority in flow table 170, switch 102 does not allow any other flow rule with priority values 212, 214, and 215 in flow table 170 (unless the user overrides the priority value of a flow rule). As a result, a new or updated flow rule arriving in switch 102 includes one of the available priority values. Hence, switch 102 does not need to change the location of the current flow rules when the new or updated flow rule arrives.

In some embodiments, if strict priority is enabled in switch 102, switch 102 generates a notification message for controller 120 indicating that the strict priority has been enabled for switch 102. Controller 120 then can maintain a set of already assigned priority values for switch 102 (e.g., priority values 212, 214, and 215). Controller 120 can provide the priority range and the already assigned priority values for switch 102 to the user. If a user generates a flow rule with an existing priority value (e.g., with priority value 214), controller 120 can notify the user about the conflict of priority values instead of issuing a corresponding flow definition. The user then can generate a flow rule with an available priority value (e.g., with priority value 213).

In addition, when switch 102 receives a generic flow rule, switch 102 converts that generic flow rule to a set of port-specific flow rules, one for each software-definable port. Switch 102 allocates priorities to these port-specific flow rules based on the number of ports. For example, since switch 102 includes 5 software-definable ports, a generic flow rule with a priority 220 is converted to 5 port-specific flow rules with priorities 220, 221, 222, 223, and 224, respectively. Switch 102 stores these converted port-specific flow rules in a memory block in memory chunk 172. Similarly, a generic flow rule with a priority 225 is converted to 5 port-specific flow rules with priorities 225, 226, 227, 228, and 229, respectively.

Switch 102 can accept generic flow rules based on the number of software-definable ports in switch 102. For example, since switch 102 includes 5 software-definable ports, switch 102 accepts generic flow definitions with priority values with an increment of 5 from a minimum priority value for generic flow definitions. If the minimum priority value for generic flow definition is 220, switch 102 accepts generic flow definitions with priority values 220, 225, 230, and so on. If switch 102 receives a generic flow definition that does not comply with the increment of 5 from the minimum priority value, switch 102 may discard that flow definition and notify the controller (e.g., controller 120).

In some embodiments, instead of relying on the increment of 5 from the minimum priority value, switch 102 can allocate priorities to the converted port-specific flow rules based on the next available set of priorities for the converted port-specific flow rules. Suppose that switch 102 receives another generic flow rule with a priority value 228. Even though switch 102 has already allocated a flow rule with a priority value 228, switch 102 converts that flow rule to 5 port-specific flow rules with next available priority values.

Port-Specific Flow Rule Management

As mentioned earlier, in conventional switches, all the flow rules are stored in the CAM based on a switch-wide priority order. Such configuration results in significant overhead when a flow rule is added or deleted, or changes its priority, because all the rules in the CAM with priority lower than the changed rule need to be rewritten to new locations. Embodiments described herein mitigate this problem by enforcing strict priority for the flows in the flow table. As a result, the flow table maintains a specific location for each flow rule corresponding to the priority value of the flow rule. The switch stores each flow rule in the corresponding location of the flow rule.

Figure 3A:
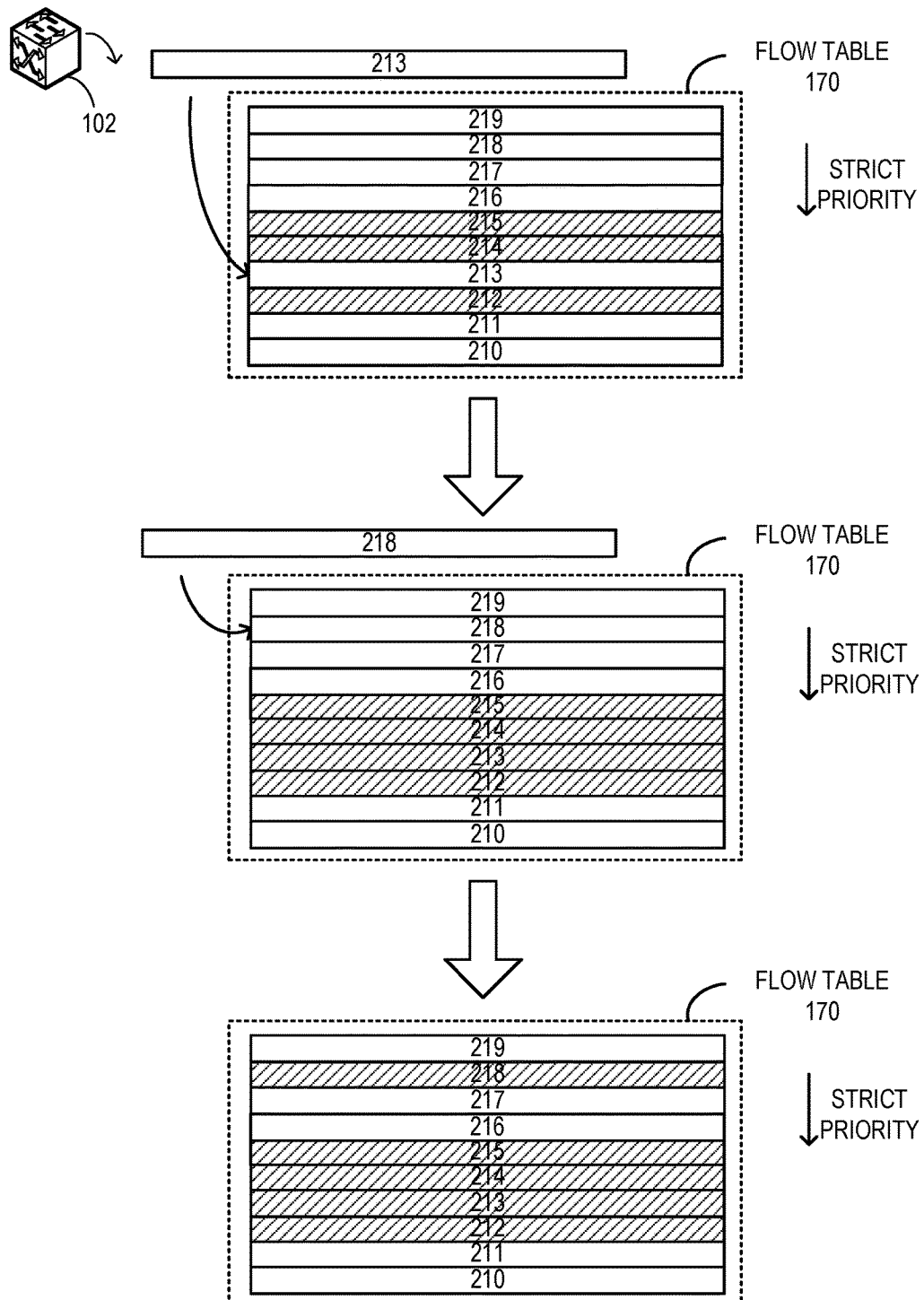
FIG. 3A illustrates an exemplary insertion of a port-specific flow rule in a flow table supporting priority-specific flow rules, in accordance with an embodiment of the present application.

FIG. 3A illustrates an exemplary insertion of a port-specific flow rule in a flow table supporting priority-specific flow rules, in accordance with an embodiment of the present application. Here, flow table 170 stores flow rules with priority values 215 and 214 in locations associated with priority values 215 and 214, respectively. During operation, controller 120 issues a flow definition for a flow rule with a priority value of 213. Upon receiving the flow rule, switch 102 stores the flow rule in the location associated with priority value 213 in flow table 170. In this way, switch 102 can check a packet in a software-defined network against flow rules with priority values 215 and 214 before the new flow rule with priority value 213 without rearranging flow rules with priority values 215 and 214.

Similarly, controller 120 issues a flow definition for a flow rule with a priority value of 218. Upon receiving the flow rule, switch 102 stores the flow rule in the location associated with priority value 218 in flow table 170. In this way, switch 102 can check a packet in a software-defined network against flow rules with priority value 218 even if flow table 170 does not include flow rules associated with priority values 216 and 217. This allows flow rule 170 to be sparsely populated with unallocated slots between flow rules.

On the other hand, if switch 102 receives a new flow rule with an existing priority value (e.g., priority value 214), switch 102 may discard the new flow rule and notifies the controller (e.g., controller 120 in the example in FIG. 1A). The controller, in turn, can prompt the user to enter a new priority value since the current priority value has already been assigned. Since the controller can maintain a set of the already assigned priority values, the controller may not issue a flow definition with a flow rule associated with an existing priority value. However, a user may override an existing priority value (e.g., by issuing an overriding instruction) and can bubble up the flow rule with the existing priority value to free up the corresponding location in flow table 170.

Figure 3B:
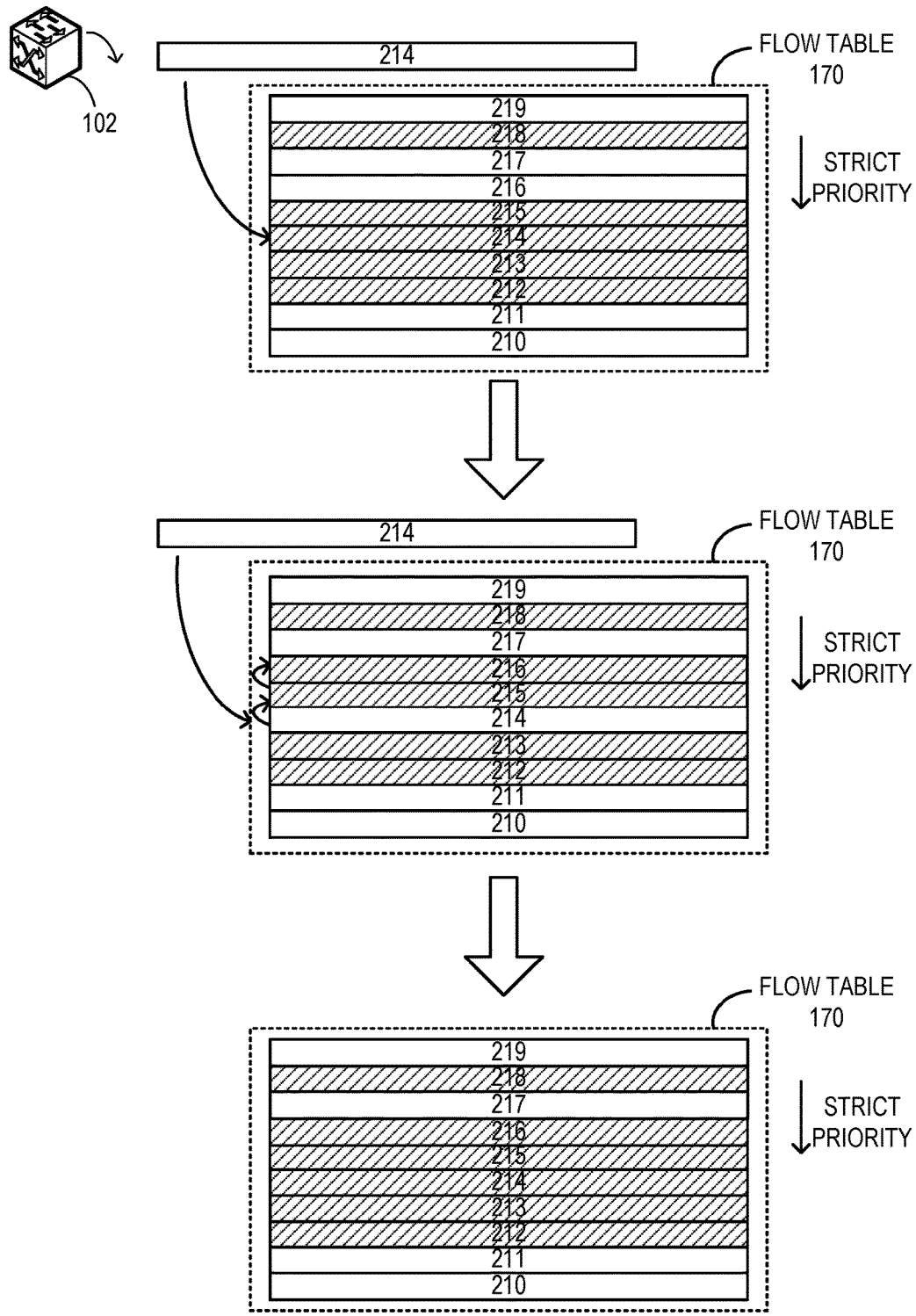
FIG. 3B illustrates an exemplary user-override for an insertion of a port-specific flow rule in a flow table supporting priority-specific flow rules, in accordance with an embodiment of the present application.

FIG. 3B illustrates an exemplary user-override for an insertion of a port-specific flow rule in a flow table supporting priority-specific flow rules, in accordance with an embodiment of the present application. During operation, if a user wishes to override an existing priority value, the user can provide that information to the controller. In turn, the controller issues a flow definition that includes the flow rule with the overriding priority value and an indicator indicating that the user has issued an overriding instruction. Since the overriding instruction causes switch 102 to bubble up the flow rules, the controller can also update its local set of currently existing priority values for switch 102 accordingly.

Upon receiving an overriding instruction from the controller for a flow rule with an existing priority value 214, switch 102 determines the lowest available priority value higher than priority value 214 in flow table 170. In this example, that available priority value is 216. Switch 102 then bubbles up all flow rules with priority values between and including 214 and 215 (i.e., determined based on 216-1). To do so, switch 102 first increments the priority value of the flow rule associated with priority value 215 and moves the flow rule to the location corresponding to priority value 216 in flow table 170. This frees the location corresponding to priority value 215 in flow table 170.

Switch 102 then increments the priority value of the flow rule associated with priority value 214 and moves the flow rule to the location corresponding to priority value 215 in flow table 170. This frees the location corresponding to priority value 214 in flow table 170. The bubbling up of the flow rules, thus, makes priority value 214 available for a new flow rule. Switch 102 then stores the new flow rule with priority value 214 in the corresponding location in flow table 170. Since the location of the flow rule with priority value 218 is beyond the locations associated with the bubbling up operation, that flow rule remains in place.

Generic Flow Rule Management

Figure 4A:
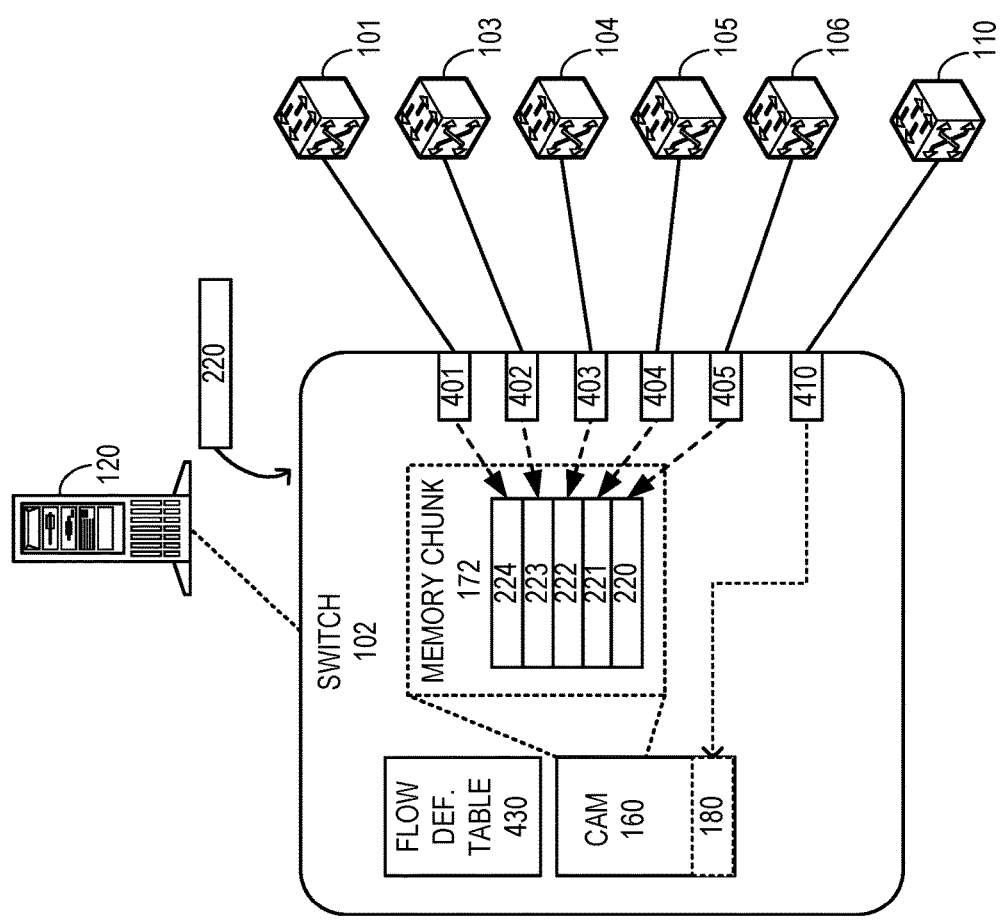
FIG. 4A illustrates an exemplary insertion of a generic flow rule in a flow table supporting priority-specific flow rules, in accordance with an embodiment of the present application.

FIG. 4A illustrates an exemplary insertion of a generic flow rule in a flow table supporting priority-specific flow rules, in accordance with an embodiment of the present application. Here, switch 102 is coupled to other software-definable switches 101, 103, 104, 105, and 106 via software-definable ports 401, 402, and 403, 404, and 405, respectively. Switch 105 also includes at least another regular port 410, which is not a software-definable port and is coupled to regular switch 110. During operation, controller 120 sends a generic flow definition to switch 102. Suppose that this flow definition includes a flow rule with priority value 220. Switch 102 expands the generic flow definition by converting the generic flow definition to port-specific flow rules with priority values 224, 223, 222, 221, and 220 for ports 401, 402, 403, 404, and 405, respectively, based on the generic flow definition. Here, switch 102 does not convert the flow rule for regular port 410.

This allows switch 102 to convert a generic flow definition to port-specific flow rules and enforce strict priority. Switch 102 then stores the generic flow definition in a flow definition table 430 with a set generic-flow flag. Flow definition table 430 can be a data structure (e.g., a linked-list), a hardware module (e.g., in CAM 160), or both. Switch 102 also stores the generated port-specific flow rules in memory chunk 172 in CAM 160. Switch 102 then processes (e.g., drops or forwards) a packet received at port 403 from switch 104 based on the flow rule with the priority value 222. On the other hand, switch 102 processes a packet received at port 410 from switch 110 based on the forwarding table 180 in CAM 160.

Figure 4B:
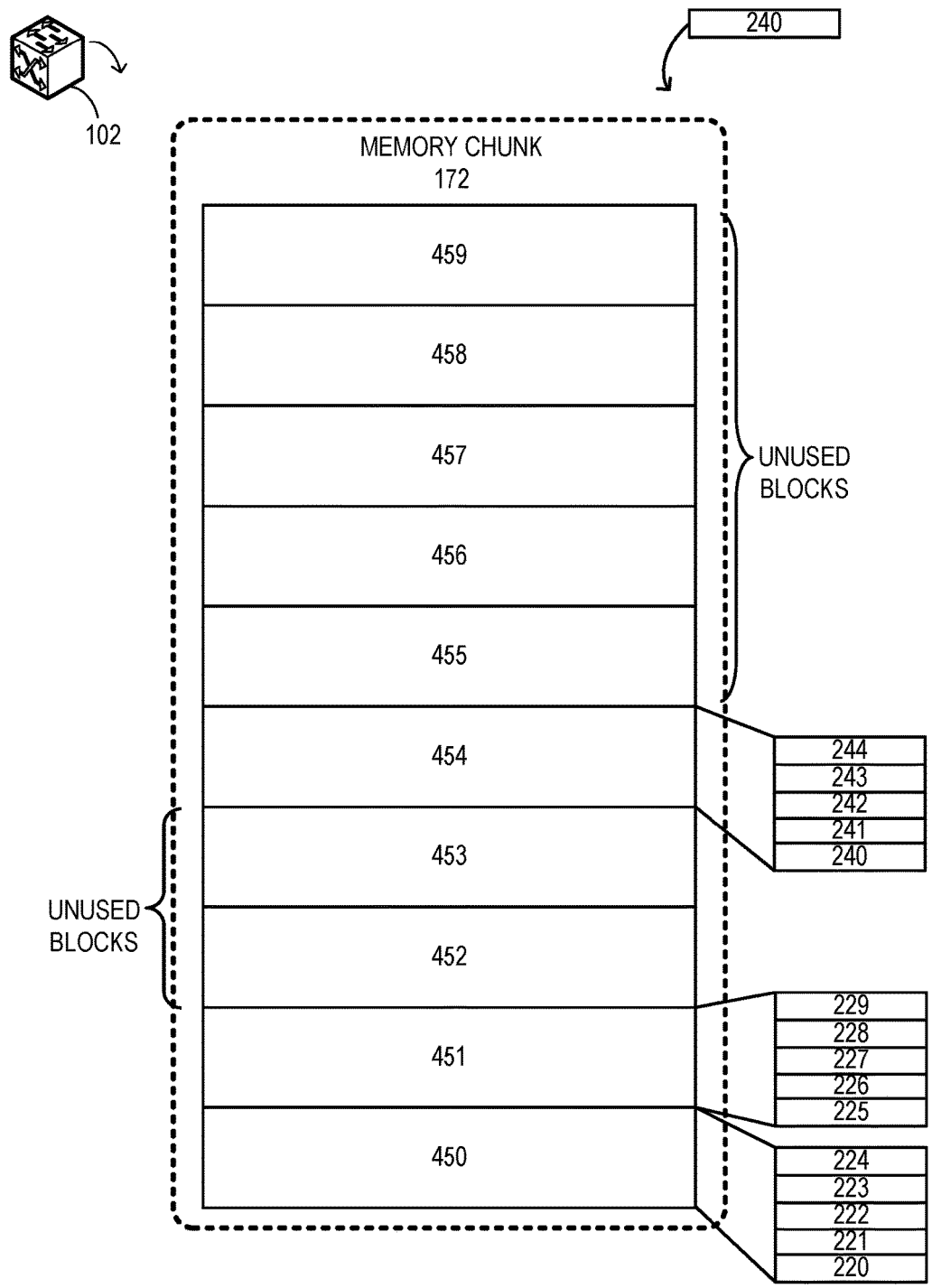
FIG. 4B illustrates exemplary priority-based memory blocks for inserting a generic flow rule in a flow table supporting priority-specific flow rules, in accordance with an embodiment of the present application.

FIG. 4B illustrates exemplary priority-based memory blocks for inserting a generic flow rule in a flow table supporting priority-specific flow rules, in accordance with an embodiment of the present application. As described in conjunction with FIG. 2, switch 102 converts a generic flow rule in a generic flow definition to a set of port-specific flow rules, each corresponding to a software-definable port. To store a respective set of converted port-specific flow rules, switch 102 can allocate a corresponding memory block. For example, if the maximum number of generic flow definitions for switch 102 is 10, switch 102 allocates 10 memory blocks 450, 451, 452, 453, 454, 455, 456, 457, 458, and 459 for the 10 sets of converted port-specific flow rules in memory chunk 172.

Switch 102 can accept generic flow rules based on the number of software-definable ports in switch 102. For example, since switch 102 includes 5 software-definable ports, switch 102 accepts generic flow definitions with priority values with an increment of 5 from a minimum priority value for generic flow definitions. If the minimum priority value for the generic flow definition is 220, switch 102 accepts generic flow definitions with priority values 220, 225, 230, and so on. Hence, if X kilobytes (X KB) of storage memory is needed to store one flow rule, the size of memory of a respective memory block can be 5X KB.

For example, the set of converted port-specific flow rules with priority values 220, 221, 222, 223, and 224 can require 5X KB of storage and can be stored in memory block 450. Similarly, the set of converted port-specific flow rules with priority values 225, 226, 227, 228, and 229 can be stored in memory block 451. Since these priority values are contiguous, the corresponding flow rules are stored in contiguous memory blocks 450 and 451. If switch 102 receives a generic flow with a non-contiguous priority value, switch 102 may store the corresponding set of converted port-specific flow rules in a non-contiguous memory block.

When switch 102 receives a generic flow definition comprising a generic flow rule with a priority value 240, switch 102 converts that generic flow rule to a set of port-specific flow rules, one for each software-definable port. Switch 102 allocates priorities to these port-specific flow rules based on the number of ports. For example, since switch 102 includes 5 software-definable ports, a generic flow rule with a priority 240 is converted to a set of 5 port-specific flow rules with priorities 240, 241, 242, 243, and 244, respectively. Switch 102 stores this set of converted port-specific flow rules in a memory block 454 in memory chunk 172. Memory block 454 can be dedicated for a generic flow definition comprising a generic flow rule with a priority value 240.

Even though memory blocks 452 and 453 remain unused, switch 102 can enforce strict priority in memory chunk 172 for the converted port-specific flow rules. To ensure that each set of converted port-specific flow rules is stored in a corresponding allocated memory block, switch 102 enforces the increment of 5 from a minimum priority value for generic flow definitions. If switch 102 receives a generic flow definition that does not comply with the increment of 5 from the minimum priority value, switch 102 may discard that flow definition and notify the controller (e.g., controller 120).

In some embodiments, instead of relying on the increment of 5 from the minimum priority value, switch 102 can allocate priorities to the converted port-specific flow rules based on the next set of available continuous priority values for the converted port-specific flow rules. This set of available continuous priority values can be in a range of priority values determined based on a minimum priority value of generic flow definitions, a maximum number of generic flow definitions, and a number of software-definable ports in switch 102. For example, if the minimum priority value of generic flow definitions is 220, the maximum number of generic flow definitions is 10, and the number of software-definable ports is 5 in switch 102, this range can include 50 priority values, starting from 220. A respective set of continuous priority values can include 5 such priority values in the range.

Figure 4C:
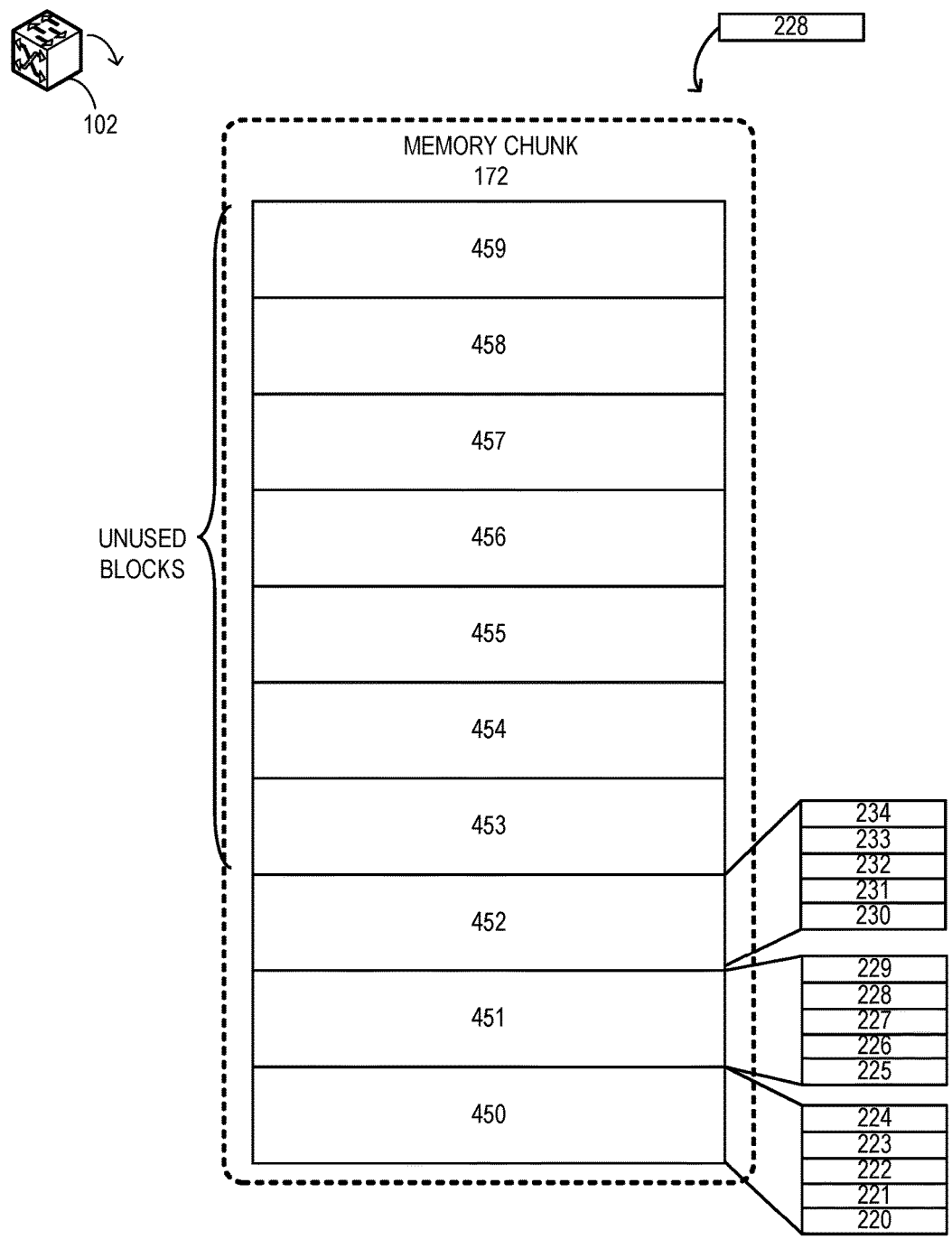
FIG. 4C illustrates exemplary memory blocks for sequentially inserting a generic flow rule in a flow table supporting priority-specific flow rules, in accordance with an embodiment of the present application.

FIG. 4C illustrates exemplary memory blocks for sequentially inserting a generic flow rule in a flow table supporting priority-specific flow rules, in accordance with an embodiment of the present application. Suppose that switch 102 receives another generic flow rule with a priority value 228. Even though switch 102 has already allocated a flow rule with a priority value 228, switch 102 converts that flow rule to a set of 5 port-specific flow rules with next available priority values 230, 231, 232, 233, and 234, respectively. Switch 102 then stores this set of converted port-specific flow rules in the next available memory block 452 in memory chunk 172.

Operations

Figure 5:
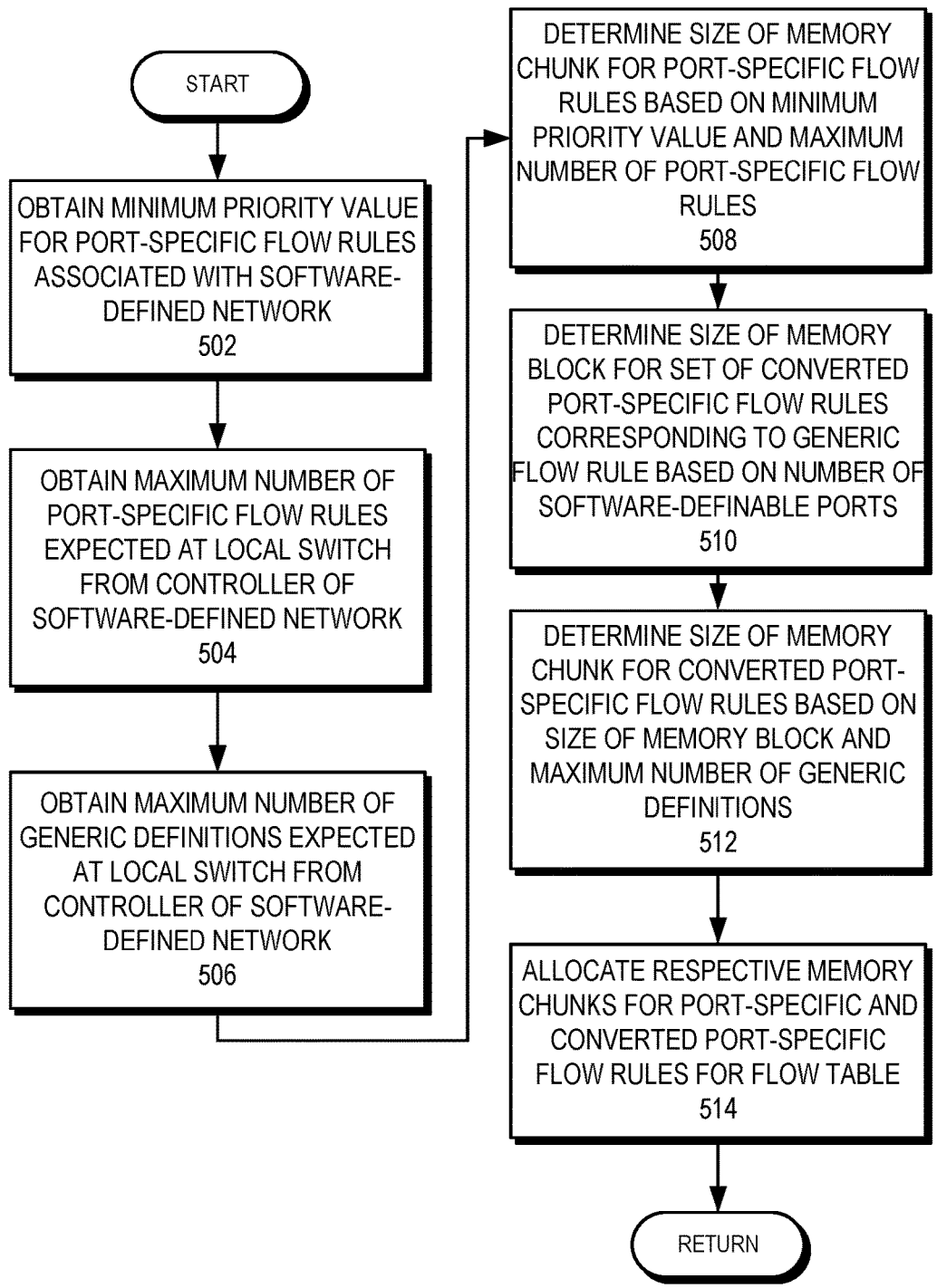
FIG. 5 presents a flowchart illustrating the process of a switch allocating memory chunks for generic and port-specific flow rules in a flow table supporting priority-specific flow rules, in accordance with an embodiment of the present application.

FIG. 5 presents a flowchart illustrating the process of a switch allocating memory chunks for generic and port-specific flow rules in a flow table supporting priority-specific flow rules, in accordance with an embodiment of the present application. During operation, the switch obtains a minimum priority value for port-specific flow rules associated with a software-defined network (operation 502). The switch obtains a maximum number of port-specific flow rules expected at the local switch from the controller of the software-defined network (operation 504). The switch also obtains a maximum number of generic definitions expected at the local switch from the controller of the software-defined network (operation 506).

The switch determines a size of the memory chunk for the port-specific flow rules based on the minimum priority value and the maximum number of port-specific flow rules (operation 508). Furthermore, the switch also determines a size of a memory block for a set of converted port-specific flow rules corresponding to a generic flow definition based on the number of software definable ports in the local switch (operation 510). The switch determines a size of the memory chunk for the converted port-specific flow rules based on the size of a memory block and the maximum number of generic flow definitions (operation 512). The switch then allocates the respective memory chunks for the port-specific and the converted port-specific flow rules for the flow table (operation 514).

Figure 6A:
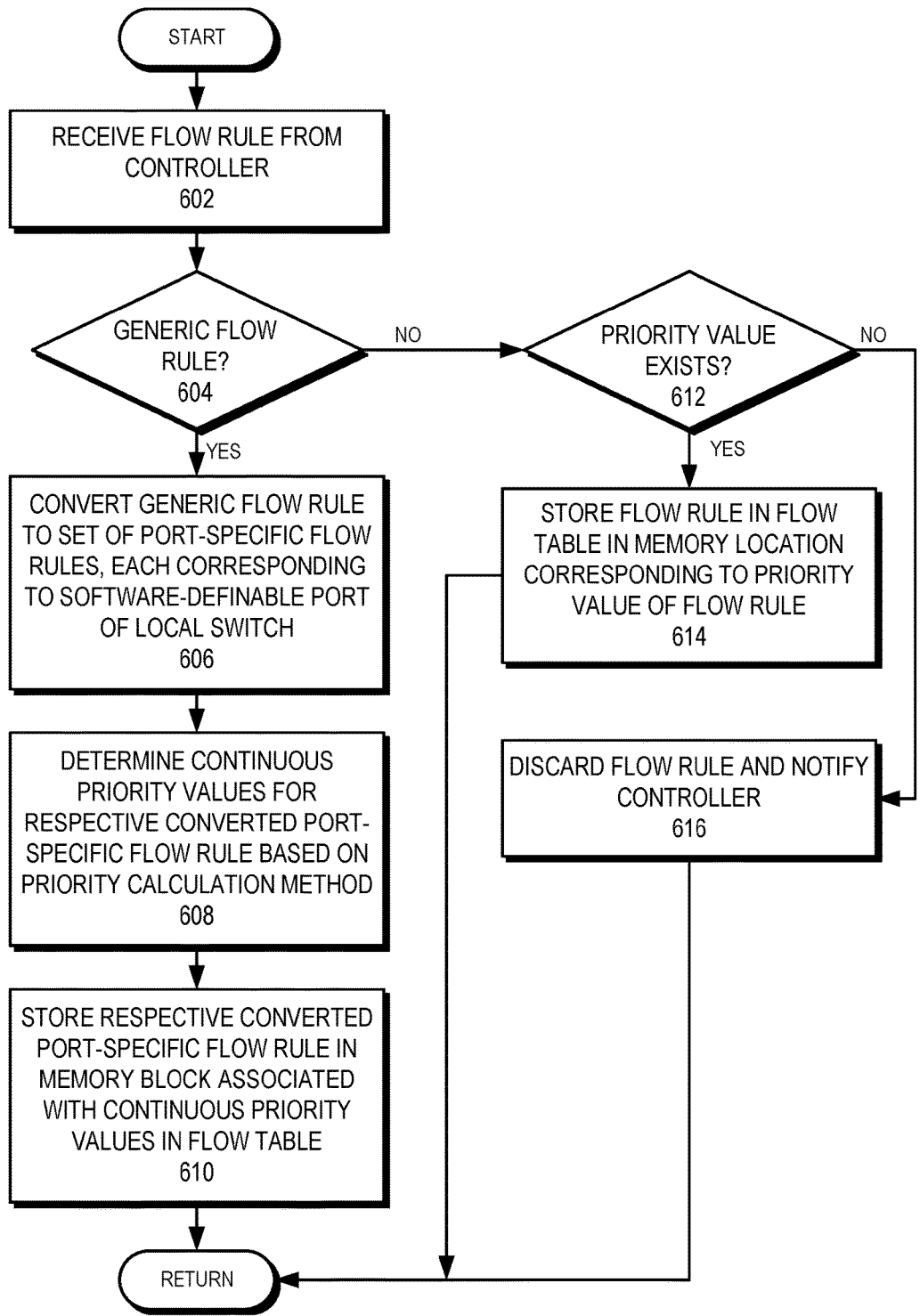
FIG. 6A presents a flowchart illustrating the process of a switch inserting generic and port-specific flow rules in a flow table supporting priority-specific flow rules, in accordance with an embodiment of the present application.

FIG. 6A presents a flowchart illustrating the process of a switch inserting generic and port-specific flow rules in a flow table supporting priority-specific flow rules, in accordance with an embodiment of the present application. During operation, the switch receives a flow rule from a controller (operation 602) and determines whether the flow rule is a generic flow rule (e.g., from a generic flow definition) (operation 604). If the flow rule is not a generic flow rule, the switch checks whether the priority value of the flow rule already exists in the flow table (operation 612). If the priority value already exists, the switch stores the flow rule in a flow table in a memory location corresponding to the priority value of the flow rule (operation 614). On the other hand, if the priority value does not exist, the switch discards the flow rule and notifies the controller (operation 616).

In some embodiments, the switch generates a message comprising a notification indicating that the priority value of the received flow rule already exists and determines an egress port for the message. It should be noted that the controller may not allow a user to issue a flow definition that includes a flow rule with an existing priority value. As a result, the switch may not receive a flow rule for which the flow rule already exists. Therefore, if the controller ensures that a user is only allowed to issue a flow definition that includes a flow rule with an available priority value, the switch may not need to check whether the priority value of the flow rule already exists in the flow table.

If the flow rule is a generic flow rule, the switch converts the generic flow rule to a set of port-specific flow rules, each corresponding to a software-definable port of the switch (operation 606). The switch determines a set of continuous priority values for respective converted port-specific flow rules based on a priority calculation method (operation 608). This priority calculation method can include, but is not limited to, allocating priority values based on a base priority value of a generic flow definition and based on the next available set of continuous priority values, as described in conjunction with FIGS. 4B and 4C. The switch then stores a respective converted port-specific flow rule in the memory block associated with continuous priority values in the flow table (operation 610). In this way, the switch also maintains strict priority for the generic flow rules.

Figure 6B:
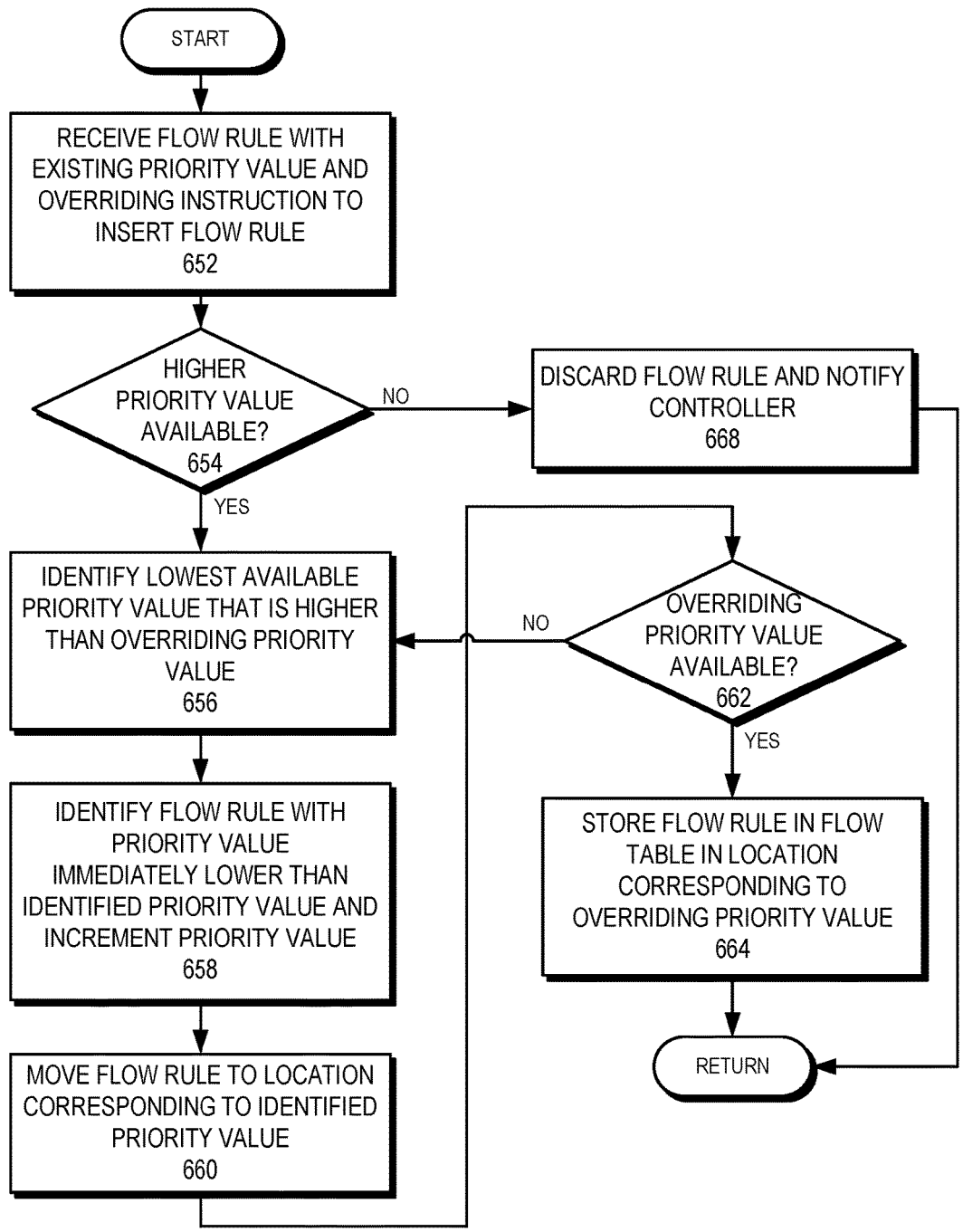
FIG. 6B presents a flowchart illustrating the process of a switch inserting a port-specific flow rule using a user-override in a flow table supporting priority-specific flow rules, in accordance with an embodiment of the present application.

FIG. 6B presents a flowchart illustrating the process of a switch inserting a port-specific flow rule using a user-override in a flow table supporting priority-specific flow rules, in accordance with an embodiment of the present application. During operation, the switch receives a flow rule with an existing priority value and an overriding instruction to insert the flow rule (operation 652). The switch then checks whether at least one priority value higher than the overriding priority value is available (operation 654). If at least one higher priority value is not available, the switch discards the flow rule and notifies the controller (operation 668).

On the other hand, if a higher priority value is available, the switch identifies the lowest available priority value that is higher than the overriding priority value (operation 656). Subsequently, the switch identifies a flow rule with a priority value immediately lower than the identified priority value and increments that priority value (operation 658). The switch then moves the flow rule to the location corresponding to the identified priority value (operation 660). In this way, the location from which the flow rule has been moved becomes the lowest available priority value that is higher than the requested priority value.

The switch checks whether the overriding priority value has become available (operation 662). If the requested value has not become available, the switch identifies the next lowest available priority value that is higher than the requested priority value (operation 656). On the other hand, if the overriding priority value has become available, the switch stores the flow rule in the flow table in a location corresponding to the overriding priority value (operation 664).

Figure 7:
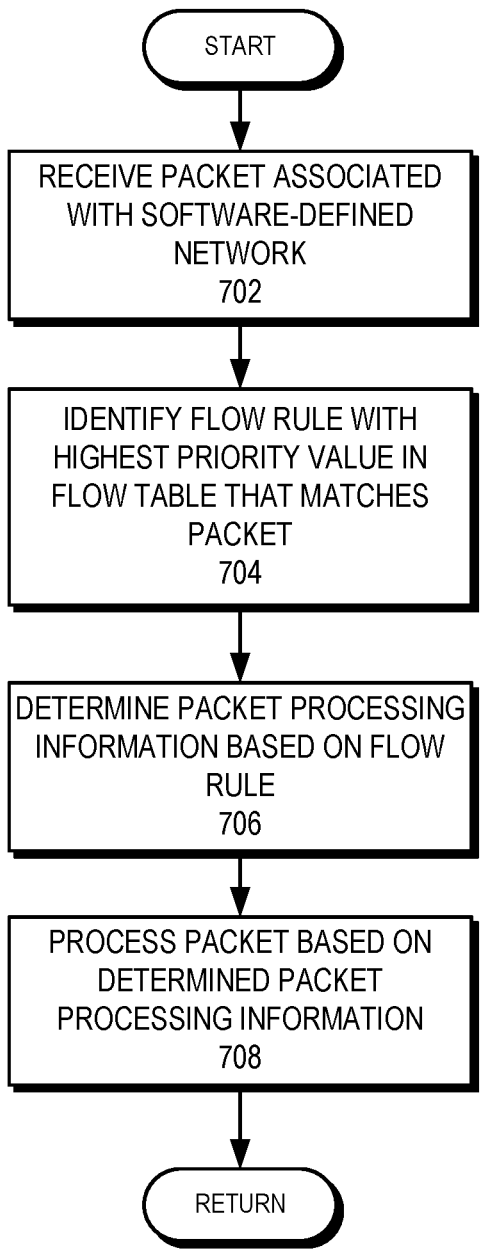
FIG. 7 presents a flowchart illustrating the process of a switch forwarding a packet based on a flow table supporting priority-specific flow rules, in accordance with an embodiment of the present application.

FIG. 7 presents a flowchart illustrating the process of a switch forwarding a packet based on a flow table supporting priority-specific flow rules, in accordance with an embodiment of the present application. During operation, the switch receives a packet associated with a software-defined network (e.g., a software-definable flow) (operation 702). The switch then identifies a flow rule with the highest priority value in the flow table that matches the packet (operation 704) and determines packet processing information based on the flow rule (operation 706). The switch processes the packet based on the determined packet processing information (operation 708). The packet processing information can indicate one or more of: an egress port for the packet, a packet drop/filtering instruction, and a port-mirroring instruction.

Exemplary Switch

Figure 8:
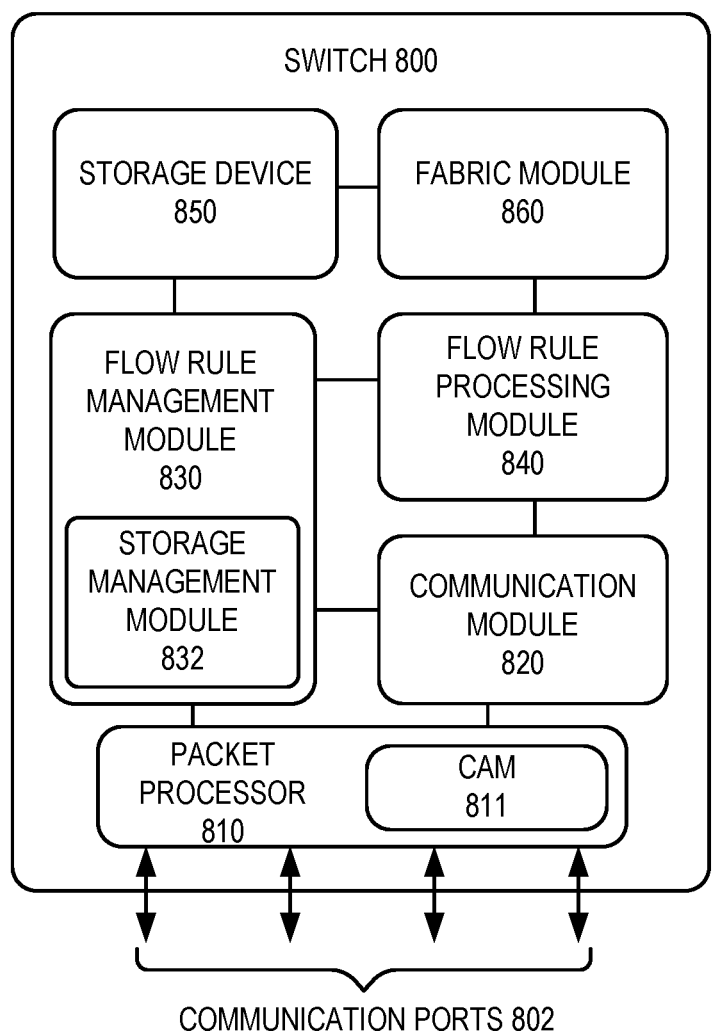
FIG. 8 illustrates an exemplary switch supporting priority-specific flow rules in a software-defined network, in accordance with an embodiment of the present application.

FIG. 8 illustrates an exemplary switch supporting priority-specific flow rules in a software-defined network, in accordance with an embodiment of the present application. In this example, a switch 800 includes a number of communication ports 802, a flow rule management module 830, a storage management module 832, a packet processor 810, a communication module 820, and a storage device 850. Packet processor 810 further includes a CAM 811. One or more of communication ports 802 are software-definable ports. These software-definable ports can be OpenFlow enabled. Switch 800 receives a software-defined data flow via the software-definable ports. Packet processor 810 extracts and processes header information from the received packets via communication ports 802.

In some embodiments, switch 800 may maintain a membership in a fabric switch, which can be a network of interconnected switches. Switch 800 then can include a fabric module 860. Fabric module 860 maintains a configuration database in storage device 850 that maintains the configuration state of every switch within the fabric switch. Fabric module 860 maintains the state of the fabric switch, which is used to join other switches. In some embodiments, switch 800 can be configured to operate in conjunction with a remote switch as an Ethernet switch or an IP network.

Communication ports 802 can include inter-switch communication channels for communication within the fabric switch. This inter-switch communication channel can be implemented via a regular communication port and based on any open or proprietary format. Communication ports 802 can also include one or more extension communication ports for communication between neighbor fabric switches. Communication ports 802 can include one or more TRILL ports capable of receiving frames encapsulated in a TRILL header.

Communication ports 802 can also include one or more IP ports capable of receiving IP packets. An IP port is capable of receiving an IP packet and can be configured with an IP address. Packet processor 810 can process TRILL-encapsulated frames and/or IP packets (e.g., encapsulated packets based on a tunneling protocol). Examples of a tunneling protocol include, but are not limited to, virtual extensible LAN (VXLAN), generic routing encapsulation (GRE), network virtualization using GRE (NVGRE), layer-2 tunneling protocol (L2TP), and multi-protocol label switching (MPLS).

During operation, communication module 820 obtains a flow rule from a notification message from a controller of a software-defined network. Flow rule management module 830 then determines whether a priority value of the flow rule is in a local flow table (e.g., in CAM 811). If the priority value of the flow rule is not in the flow table, flow rule management module 830 stores the flow rule in a location of the flow table allocated for the priority value. On the other hand, if the priority value of the flow rule is in the local flow table, flow rule management module 830 can discard the flow rule obtained from the notification message and generates a second notification message for the controller indicating that the priority value of the flow rule is already in the flow table.

However, if user-overriding is enabled for switch 800, upon identifying an overriding instruction, flow rule management module 830 frees the location of the flow table allocated for the priority value and stores the flow rule in the location. Furthermore, storage management module 832 can determine a size of a first memory chunk for port-specific flow rules and allocates the first memory chunk of the determined size for the flow table.

In some embodiments, switch 800 includes a flow rule processing module 840, which converts a generic flow rule to a set of port-specific flow rules. Storage management module 832 then can determine a size of a second memory chunk for the converted port-specific flow rules (i.e., corresponding to the generic flow rules) and allocate the second memory chunk of the determined size for the flow table. Flow rule processing module 840 can also determine a set of continuous priority values for the set of port-specific flow rules. Flow rule management module 830 can store the set of port-specific flow rules in a memory block corresponding to the set of continuous priority values in the second memory chunk.

Note that the above-mentioned modules can be implemented in hardware as well as in software. In one embodiment, these modules can be embodied in computer-executable instructions stored in a memory which is coupled to one or more processors in switch 800. When executed, these instructions cause the processor(s) to perform the aforementioned functions.

In summary, embodiments described herein provide a switch and a method for efficient management of flow rules in a software-defined network. The switch can include one or more ports, a communication module, and a flow rule management module. During operation, the communication module obtains a flow rule from a notification message from a controller of a software-defined network. The flow rule management module then determines whether a priority value of the flow rule is in a local flow table. The flow table can store flow rules received from the controller. If the priority value of the flow rule is not in the local flow table, the flow rule management module stores the flow rule in a location of the flow table allocated for the priority value.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
one or more ports;
communication circuitry configured to obtain a flow rule based on a notification message from a controller of a software-defined network; and
flow rule management circuitry configured to:
determine whether a priority value of the flow rule is in a local flow table, wherein the flow table stores flow rules received from the controller;
in response to determining that the priority value of the flow rule is not in the local flow table, store the flow rule in a location of the flow table allocated for the priority value, and
in response to determining that the priority value of the flow rule exists in the local flow table,
identify an overriding instruction for the priority value, and
free the location of the flow table allocated for the priority value by bubbling up a second flow rule stored in the location.

2. The switch of claim 1, wherein in response to determining that the priority value of the flow rule is in the local flow table, the flow rule management module is further configured to:
discard the flow rule obtained from the notification message; and
generate a second notification message for the controller indicating that the priority value of the flow rule is already in the flow table.

3. The switch of claim 1, wherein in response to determining that the priority value of the flow rule is in the local flow table, the flow management module is further configured to:
store the flow rule in the location.

4. The switch of claim 1, wherein the flow table is stored in a content-addressable memory (CAM).

5. The switch of claim 1, further comprising storage management circuitry configured to:
determine a size of a first memory chunk for port-specific flow rules based on a minimum priority value and a maximum number of port-specific flow rules expected at the switch; and
allocate the first memory chunk of the determined size for the flow table.

6. The switch of claim 1, further comprising flow rule processing circuitry configured to convert a generic flow rule to a set of port-specific flow rules, wherein a respective converted port-specific flow rule is specific to a software-definable port in the one or more ports.

7. The switch of claim 6, further comprising storage management circuitry configured to:
determine a size of a second memory chunk for converted port-specific flow rules based on a maximum number of generic flow rules expected at the switch and a number of software-definable ports of the switch; and
allocate the second memory chunk of the determined size for the flow table, thereby allowing a respective converted flow-specific flow rule to be stored in the flow table.

8. The switch of claim 6, wherein the flow rule processing circuitry is further configured to determine a set of continuous priority values for the set of port-specific flow rules based on one or more of:
a base priority value for the generic flow rule; and
a set of next available continuous priority values.

9. The switch of claim 8, wherein the flow rule management circuitry is further configured to store the set of port-specific flow rules in a memory block in the second memory chunk, wherein the memory block corresponds to the set of continuous priority values.

10. The switch of claim 1, wherein the switch is an OpenFlow-capable switch.

11. A method for facilitating efficient flow-rule management for a switch, comprising:
obtaining a flow rule from a notification message from a controller of a software-defined network;
determining whether a priority value of the flow rule is in a flow table of the switch, wherein the flow table stores flow rules received from the controller;
in response to determining that the priority value of the flow rule is not in the local flow table, storing the flow rule in a location of the flow table allocated for the priority value; and
in response to determining that the priority value of the flow rule exists in the local flow table,
identifying an overriding instruction for the priority value, and
freeing the location of the flow table allocated for the priority value by bubbling up a second flow rule stored in the location.

12. The method of claim 11, wherein, in response to determining that the priority value of the flow rule is in the local flow table, the method further comprises:
discarding the flow rule obtained from the notification message; and
generating a second notification message for the controller indicating that the priority value of the flow rule is already in the flow table.

13. The method of claim 11, wherein, in response to determining that the priority value of the flow rule is in the local flow table, the method further comprises:
storing the flow rule in the location.

14. The method of claim 11, wherein the flow table is stored in a content-addressable memory (CAM).

15. The method of claim 11, further comprising:
determining a size of a first memory chunk for port-specific flow rules based on a minimum priority value and a maximum number of port-specific flow rules expected at the switch; and
allocating the first memory chunk of the determined size for the flow table.

16. The method of claim 11, further comprising converting a generic flow rule to a set of port-specific flow rules, wherein a respective converted port-specific flow rule is specific to a software-definable port of the switch.

17. The method of claim 16, further comprising:
determining a size of a second memory chunk for converted port-specific flow rules based on a maximum number of generic flow rules expected at the switch and a number of software-definable polls of the switch; and
allocating the second memory chunk of the determined size for the flow table, thereby allowing a respective converted flow-specific flow rule to be stored in the flow table.

18. The method of claim 16, further comprising determining a set of continuous priority values for the set of port-specific flow rules based on one or more of:
a base priority value for the generic flow rule; and
a set of next available continuous priority values.

19. The method of claim 18, further comprising storing the set of port-specific flow rules in a memory block in the second memory chunk, wherein the memory block corresponds to the set of continuous priority values.

20. The method of claim 11, wherein the switch is an OpenFlow-capable switch.

* * * * *